Dec. 27, 1927.
D. B. WILLIAMS
LOW FUEL ALARM FOR MOTOR VEHICLES
Filed March 21, 1924
1,654,443
2 Sheets-Sheet 1
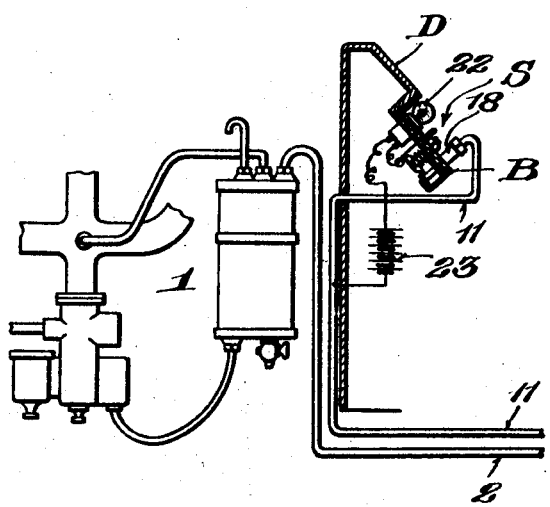
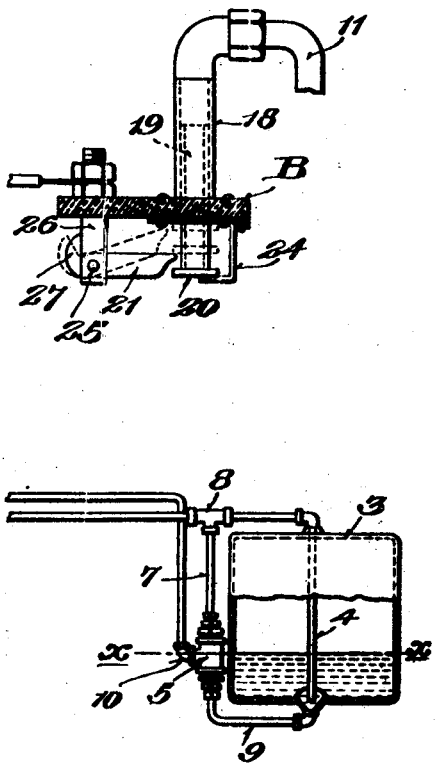
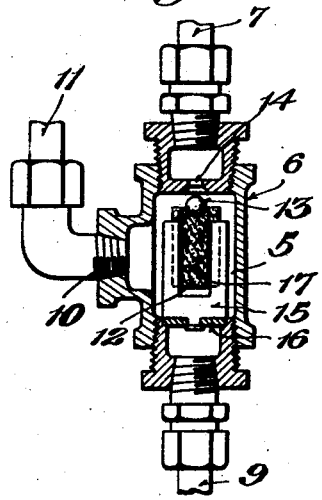
Inventor
Dick B. Williams,
WITNESSES:—
Attorney Dec. 27, 1927.

D. B. WILLIAMS 1,654,443

LOW FUEL ALARM FOR MOTOR VEHICLES

Filed March 21, 1924  2 Sheets-Sheet 2

Patented Dec. 27, 1927.

1,654,443

UNITED STATES PATENT OFFICE.

DICK B. WILLIAMS, OF CHICAGO, ILLINOIS, ASSIGNOR TO W. OGDEN COLEMAN, OF CHICAGO, ILLINOIS.

LOW-FUEL ALARM FOR MOTOR VEHICLES.

Application filed March 21, 1924. Serial No. 700,938.

This invention relates to a low fuel alarm system having special utility in its application to the fuel feed system of motor vehicles, particularly to the vacuum feed system.

To that end the invention primarily has for its object the provision of a simple and entirely reliable low fuel alarm operated by the vacuum feed device of the fuel feed system of a motor vehicle, the said alarm being actively brought into play and actuated after the liquid fuel has reached a predetermined low level in the storage tank or reservoir. A special object of the invention is to provide a low fuel alarm of that character which is not affected by vibrations or jars of the vehicles, and will only operate to intermittently give its alarm when the liquid fuel has reached the low level at which point it is desired to warn the operator of the car that his supply of fuel needs replenishing.

Another object of the invention is to provide an alarm device for indicating a low level of the fuel which may be simply and economically coupled into an ordinary vacuum feed fuel system without alterations in or affecting the operation thereof.

With these and other objects in view which will readily appear to those familiar with the art, the invention consists in the novel combination of instrumentalities hereinafter more fully described, illustrated and claimed.

Certain preferred practical embodiments of the invention are shown in the accompanying drawings, in which:—

Figure 1 is a diagrammatic view partly in section illustrating a vacuum feed fuel system for motor vehicles having the present invention fitted thereto.

Fig. 2 is a detail sectional view of the T-connector or pipe union which provides the cut-off chamber.

Fig. 3 is a detail view of the float check valve for the cut-off chamber.

Fig. 4 is a top plan view of the float check valve and its guiding support.

Fig. 5 is a detail view of the electrical circuit closer for the alarm or signal.

Like references designate corresponding parts in the several figures of the drawings.

Figure 6:
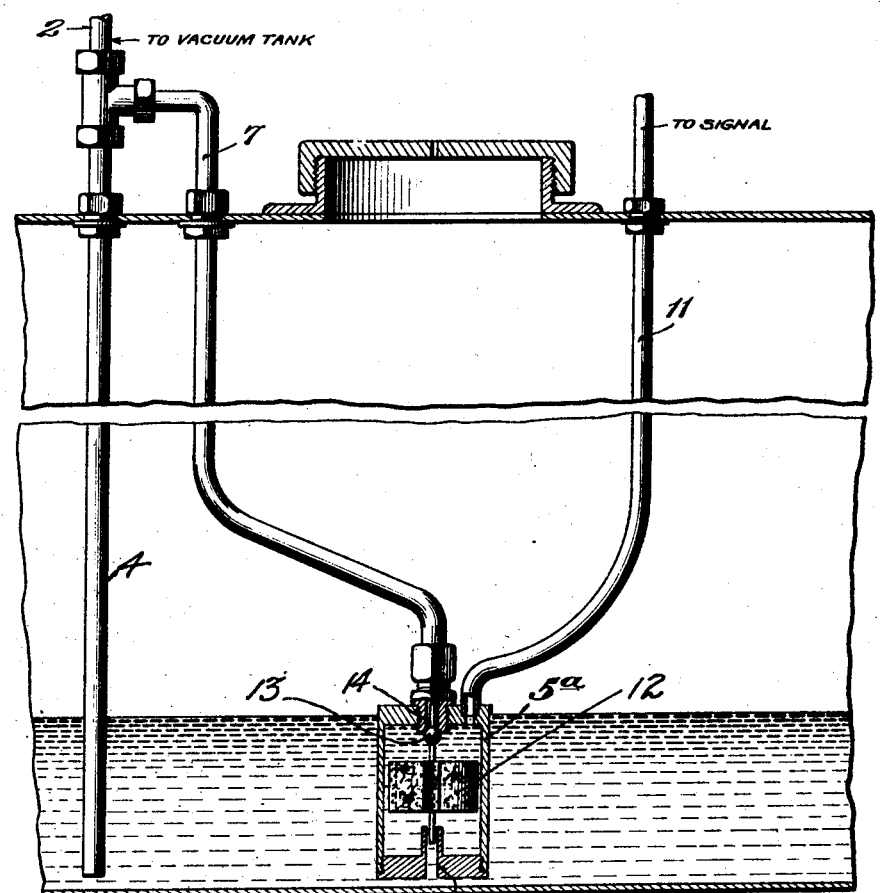
Fig. 6 is a sectional view illustrating a modification wherein the cut-off chamber is arranged directly within the bottom part of the storage tank.

In carrying forward the invention the conventional parts of the vacuum feed fuel system for a motor vehicle are left intact, but are utilized to operate the low fuel alarm constituting the present invention. Referring to these features shown in the drawings the numeral 1 designates the vacuum feed device, common to most of the modern fuel feeding systems and having a feed pipe 2 which usually enters the top of the storage tank 3 and has an intake pipe 4 extending downwardly in the tank to an extreme point at the bottom thereof so as to reach all of the fuel in the tank up to the time that it is actually emptied. Associated with these parts is what may be termed a cut-off chamber 5 preferably provided by a T-connector or pipe union 6 to one end of which is connected a pipe 7 which is joined at 8 to the feed pipe 2, and the other end of which is connected by a liquid pipe 9 to the bottom part of the storage tank 3. At an intermediate point between its ends the cut-off chamber 5 has connected therewith as at 10 one end of a signal pipe 11 which may conveniently terminate at the dash D of the vehicle and connecting with the signal device designated in its entirety by the letter S, and to be presently described.

Within the cut-off chamber 5 is mounted a float check valve 12 which is preferably of cork and provided at one end with a valve element or head 13 adapted to seat at the underside of a ported valve seat 14 which is in communication with the feed pipe connection 7. The float check valve 12 is preferably held and guided by a guiding support consisting of an upright yoke or guide 15 fitted to a perforated supporting plate 16 held in a fixed position at the lower side of the cut-off chamber 5. Grooves 17 in the sides of the float body slidably engage the sides of the yoke or guide 15, thereby serving to hold the float check valve in proper operative position at all times with relation to the valve seat 14.

The signal device S includes a circuit closer consisting of a cylinder 18 connecting with the signal pipe 11, and a tubular piston 19 slidably fitting in the cylinder 18 and projecting through one end of the latter, the piston 19 being provided at its outer end with a contact head or piece 20 adapted to be brought into contact with another contact member 21 which is included in an electrical circuit with a lamp or other electrical signal 22 and a source of energy 23 such as a battery. The parts referred to are preferably carried by a suitable base B and conventionally insulated as indicated so that the electrical circuit can be maintained from the source of energy through the contacts 20 and 21 and the signal 22. A supporting bracket 24, or its equivalent holds the piston 19 in normal position out of contact with the contact member 21, and the latter is preferably in the form of a latch pivoted as at 25 to a supporting arm 26 and having a shouldered end 27 which normally holds it in the full line position shown in Fig. 5.

When the level of liquid in the storage tank 3 is above the predetermined low level line x—x shown in Fig. 1, the liquid fills the cut-off chamber 5 and not only seals the end 10 of the signal pipe 11 but also elevates the float check valve so that the port 14 is closed and is definitely held closed so that vibrations or jars will not bring the signal pipe 11 into communication with the vacuum feed pipe 2 when the level of fuel is high in the storage tank. However, when the fuel level lowers to and below the predetermined low level line the check valve 12 lowers thereby uncovering the port 14 and exposing the pipe 11 to the suction within the pipes 2 and 7. As the level of the gasoline is lowered below the said low level point the end 10 of the pipe 11 gradually becomes unsealed so that the suction in the pipes 2 and 7 will be communicated to the pipe 11 with the result of lifting the piston 19 to bring its contact head 20 into circuit closing contact with the contact latch 21, at the same time lifting the latter and dropping back onto it where the circuit will be held closed and the signal constantly given until the operator releases the head 20 by manually lifting the latch 21.

The modification suggested in Figure 6 illustrates the cut-off chamber placed in the bottom part of the storage tank. In this view the storage chamber is designated by the reference 5ª, and the same has a fuel inlet opening 9ª in communication with the bottom part of the tank and having the same function as the fuel pipe 9 in the construction shown in Fig. 1. Also, in the said modification the signal pipe 11 is preferably connected to the top part of the chamber 5ª but in other respects the action and function of the modified arrangement are precisely the same as that of the arrangement shown in Fig. 1. In the one case the cut-off chamber is housed within the storage tank and in the other case it is arranged outside of the storage tank.

In all forms of the invention the fluid check valve is an important feature because with the fuel level high enough to seat the check valve any suction in the pipe 7 will serve only to seat the valve more firmly and any liquid standing in the cut-off chamber 5 cannot be affected. But, with the fuel level below the predetermined point the suction will act through the open check valve on the signal pipe 11 with the result of causing the operation above described and that operation will take place before it would be possible to re-lift the check float valve. Also, it should be noted that the perforated disk 16 acts as an anti-splash device to prevent splashing of fuel in the cut-off chamber from affecting the float valve. Thus the device is safeguarded from being affected by jars or vibrations of the vehicle, or from displacements of the liquid due to such jars or vibrations.

Various changes in the form, proportion and minor details of construction may be resorted to without departing from the spirit or sacrificing any of the advantages of the invention.

I claim:—

1. A low level fuel alarm for motor vehicles comprising in combination with the vacuum fuel system of the motor including the fuel reservoir and feed pipe connecting therewith, a signal pipe provided with suction-operated signal means and having one end arranged at the predetermined low level point for the fuel in the reservoir, a cut-off chamber arranged at said predetermined low level point and having connections respectively with the fuel reservoir, with the feed pipe and with said signal pipe, and an automatically operating valve arranged in said cut-off chamber.

2. A low level fuel alarm for motor vesicles comprising in combination with the vacuum fuel system of the motor including the fuel reservoir and the feed pipe connecting therewith, a cut-off chamber arranged at a predetermined low level and in communication with the reservoir and with the feed pipe, a signal pipe connected with said cut-off chamber and provided with suction-operated signal means, and a float check valve arranged within said chamber and adapted, according to the level of the liquid, to open and cut off communication between the signal pipe and the feed pipe.

3. A low level fuel alarm for motor vehicles comprising in combination with the vacuum fuel system of the motor including the fuel reservoir and the feed pipe connecting therewith, a cut-off chamber arranged at a predetermined low level and having communication with the reservoir and with the feed pipe, a signal pipe connected with said cut-off chamber and provided with suction-operated signal means, an anti-splash guiding support within the cut-off chamber, and a float check valve slidably interlocking with said support and arranged to open and cut off communication between the signal pipe and the feed pipe.

In testimony whereof I hereunto affix my signature.

DICK B. WILLIAMS.